(12) United States Patent
Lee et al.

(10) Patent No.: US 11,349,578 B2
(45) Date of Patent: May 31, 2022

(54) VEHICLE, SERVER, VEHICLE SYSTEM AND METHOD FOR RECOMMENDING A RADIO SIGNAL

(71) Applicants: HYUNDAI MOTOR COMPANY, Seoul (KR); KIA MOTORS CORPORATION, Seoul (KR)

(72) Inventors: Seung Shin Lee, Seoul (KR); Soon Kwon Paik, Yongin-si (KR); Chang Woo Chun, Suwon-si (KR); Sung Soo Park, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 21 days.

(21) Appl. No.: 16/802,142

(22) Filed: Feb. 26, 2020

(65) Prior Publication Data
US 2021/0126720 A1   Apr. 29, 2021

(30) Foreign Application Priority Data
Oct. 24, 2019   (KR) ......................... 10-2019-0133085

(51) Int. Cl.
| | | |
|---|---|---|
| *H04B 17/00* | (2015.01) | |
| *H04B 17/23* | (2015.01) | |
| *G01C 21/36* | (2006.01) | |
| *H04B 17/24* | (2015.01) | |
| *H04B 17/318* | (2015.01) | |

(52) U.S. Cl.
CPC ......... *H04B 17/23* (2015.01); *G01C 21/3605* (2013.01); *H04B 17/24* (2015.01); *H04B 17/318* (2015.01)

(58) Field of Classification Search
CPC ............ G01C 21/3691; G01C 21/3602; G01C 21/3626; G01C 21/3885; G01C 21/34; G01C 21/3605; H04B 17/23; H04B 17/24; H04B 17/318
See application file for complete search history.

(56) References Cited

U.S. PATENT DOCUMENTS

| | | | |
|---|---|---|---|
| 8,755,764 B2 * | 6/2014 | Yi ........................ | H04W 76/50 455/404.1 |
| 2021/0104004 A1 * | 4/2021 | Kim .................... | B60W 30/182 |

\* cited by examiner

*Primary Examiner* — Nhan T Le
(74) *Attorney, Agent, or Firm* — Lempia Summerfield Katz LLC

(57) ABSTRACT

A vehicle system includes: a server configured to set a radio signal recommendation scheme based on whether a destination is set, determine whether a radio signal recommended in the set recommendation scheme is applicable, and transmit a radio signal recommendation list generated based on a determination result; and a vehicle configured to receive a radio signal. The vehicle receives the radio signal recommendation list from the server when a strength of the received radio signal is less than a specified value, compares a strength of at least one radio signal included in the radio signal recommendation list with the strength of the received radio signal, and determines whether to receive the recommended radio signal based on the comparison result.

15 Claims, 13 Drawing Sheets

VEHICLE, SERVER, VEHICLE SYSTEM AND METHOD FOR RECOMMENDING A RADIO SIGNAL

CROSS-REFERENCE TO RELATED APPLICATION

This application claims the benefit of priority to Korean Patent Application No. 10-2019-0133085, filed in the Korean Intellectual Property Office on Oct. 24, 2019, the entire contents of which are incorporated herein by reference.

TECHNICAL FIELD

The present disclosure relates to a vehicle, a server, a vehicle system, and a method of recommending a radio signal.

BACKGROUND

A vehicle may be equipped with an audio system so that the user may easily listen to music. In general, the audio system includes a receiver for receiving a radio signal. Thus, the audio system may select a radio channel desired by a user through a simple operation and receive the radio signal.

Meanwhile, even if the radio channel is the same broadcasting channel, the broadcasting channel uses different frequencies according to a region. Thus, it is difficult to receive the radio signal when the vehicle is travelling in a different frequency region. In addition, when the reception of a radio signal is poor due to the weather, or in a poor reception region, it is not easy to receive the radio signal. Thus, the user has to give up listening to the radio program or reset the reception frequency cumbersomely.

SUMMARY

The present disclosure has been made to solve the above-mentioned problems occurring in the prior art while advantages achieved by the prior art are maintained intact.

An aspect of the present disclosure provides a vehicle, a server, a vehicle system, and a method for recommending a radio signal. The server, vehicle system, and method can recommend another radio signal of the same broadcast channel or a replaceable broadcast channel when it is not easy to receive a radio signal.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a vehicle system includes a server configured to set a radio signal recommendation scheme based on whether a destination is set. The server is further configured to determine whether a recommended radio signal recommended in a set recommendation scheme is applicable. The server is further configured to transmit a radio signal recommendation list generated based on a determination result. The vehicle system further comprises a vehicle configured to receive a radio signal. The vehicle receives the radio signal recommendation list from the server when a strength of the received radio signal is less than a specified value. The vehicle compares a strength of at least one recommended radio signal included in the radio signal recommendation list with the strength of the received radio signal. The vehicle determines whether to receive the recommended radio signal based on a comparison result.

The server may receive information about whether the destination is set from the vehicle. The server may determine to recommend a radio signal based on radio signal information corresponding to road information as the radio signal recommendation scheme when the server determines that the destination is set.

The server may receive the information about whether the destination is set from the vehicle. The server may determine whether a radio signal is recommendable based on radio signal information corresponding to a polygon area when the destination is not set.

The server may determine to recommend the radio signal based on the radio signal information corresponding to the polygon area as the radio signal recommendation scheme when the server determines that the radio signal is recommendable based on the signal information corresponding to the polygon area.

The server may determine to recommend a radio signal based on radio signal information corresponding to administrative area as the radio signal recommendation scheme when the server determines that the radio signal is unrecommendable based on the signal information corresponding to the polygon area.

The server may determine that the recommended radio signal is applicable. The server may generate the radio signal recommendation list based on the recommended radio signal when the server determines that a broadcast channel corresponding to the recommended radio signal recommended in the determined recommendation scheme is the same as a broadcast channel corresponding to the radio signal received by the vehicle.

The server may determine that the recommended radio signal is not applicable and generate the radio signal recommendation list based on user propensity information when the server determines that a broadcast channel corresponding to the recommended radio signal recommended in the determined recommendation scheme is different from a broadcast channel corresponding to the radio signal received by the vehicle.

The vehicle may receive the at least one recommended radio signal included in the radio signal recommendation list when the strength of the at least one recommended radio signal included in the radio signal recommendation list exceeds the strength of the currently received radio signal.

The vehicle may re-receive the radio signal recommendation list when the strength of the at least one recommended radio signal included in the radio signal recommendation list is equal to or less than the strength of the currently received radio signal.

According to another aspect of the present disclosure, a server includes a communication device configured to receive information about whether a destination is set from a vehicle. The server further includes a controller configured to set a radio signal recommendation scheme based on whether the destination is set. The controller is further configured to determine whether a recommended radio signal recommended in a set recommendation scheme is applicable. The controller is further configured to transmit a radio signal recommendation list generated based on a determination result.

The controller may determine to recommend a radio signal based on a radio signal corresponding to road information as the radio signal recommendation scheme when the controller determines that the destination is set.

The controller may determine whether a radio signal is recommendable based on radio signal information corresponding to a polygon area when the destination is not set.

The controller may determine to recommend a radio signal based on radio signal information corresponding to administrative area as the radio signal recommendation scheme when the controller determines that the radio signal is unrecommendable based on the signal information corresponding to the polygon area.

According to another aspect of the present disclosure, a vehicle includes a radio receiver configured to receive a radio signal. The vehicle further includes a controller configured to receive a radio signal recommendation list from a server when a strength of the received radio signal is less than a specified value. The controller is further configured to compare a strength of at least one recommended radio signal included in the radio signal recommendation list with the strength of the received radio signal. The controller is further configured to determine whether to receive the recommended radio signal based on a comparison result.

The controller may receive the at least one recommended radio signal included in the radio signal recommendation list when the strength of the at least one recommended radio signal included in the radio signal recommendation list exceeds the strength of the currently received radio signal. The controller may re-receive a radio signal recommendation list when the strength of the at least one recommended radio signal included in the radio signal recommendation list is equal to or less than the strength of the currently received radio signal.

According to another aspect of the present disclosure, a method of recommending a radio signal includes receiving, by a vehicle, a radio signal. The method further includes determining, by a server, a radio signal recommendation scheme based on whether a destination of the vehicle is set when a strength of the received radio signal is less than a specified value. The method further includes determining whether a recommended radio signal recommended in the recommendation scheme determined by the server is applicable. The method further includes generating a radio signal recommendation list based on a determination result. The method further includes receiving the radio signal recommendation list from the server. The method further includes comparing a strength of at least one recommended radio signal included in the radio signal recommendation list with a strength of the currently received radio signal. The method further includes determining whether to receive the recommended radio signal based on a comparison result.

The determining of the radio signal recommendation scheme may include determining to recommend a radio signal based on radio signal information corresponding to road information as the radio signal recommendation scheme when having determined that the destination of the vehicle is set.

The determining of the radio signal recommendation scheme may further include determining whether a radio signal is recommendable based on radio signal information corresponding to a polygon area when the destination of the vehicle is not set.

The determining of whether the radio signal is recommendable may further include determining to recommend a radio signal based on radio signal information corresponding to administrative area as the radio signal recommendation scheme when having determined that the radio signal is unrecommendable based on the signal information corresponding to the polygon area.

The generating of the radio signal recommendation list may include determining that the recommended radio signal is applicable. The generating the radio signal recommendation list may further include generating the radio signal recommendation list based on the recommended radio signal when having determined that a broadcast channel corresponding to the recommended radio signal recommended in the determined recommendation scheme is the same as a broadcast channel corresponding to the radio signal received by the vehicle.

The generating of the radio signal recommendation list may include determining that the recommended radio signal is not applicable. The generating the radio signal recommendation list may further include generating the radio signal recommendation list based on user propensity information when having determined that the broadcast channel corresponding to the recommended radio signal recommended in the determined recommendation scheme is different from the broadcast channel corresponding to the radio signal received by the vehicle.

The determining of whether to receive the radio signal based on the comparison result may further include receiving the at least one recommended radio signal included in the radio signal recommendation list when the strength of the at least one recommended radio signal included in the radio signal recommendation list exceeds the strength of the currently received radio signal.

The determining of whether to receive the radio signal based on the comparison result may further include re-receiving a radio signal recommendation list when the strength of the at least one recommended radio signal included in the radio signal recommendation list is equal to or less than the strength of the currently received radio signal.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
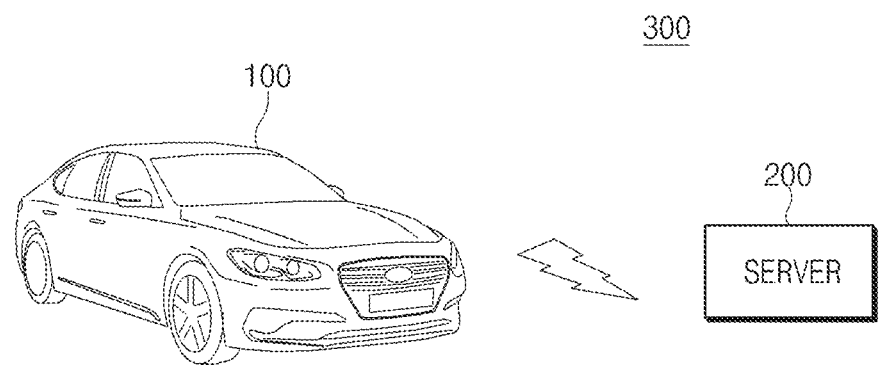
FIG. 1 is a view illustrating a configuration of a vehicle system for recommending a radio signal according to an embodiment of the present disclosure.

Hereinafter, some embodiments of the present disclosure are described in detail with reference to the drawings. In adding the reference numerals to the components of each drawing, it should be noted that an identical or equivalent component is designated by an identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. Such terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

FIG. 1 is a view illustrating a configuration of a vehicle system for recommending a radio signal according to an embodiment of the present disclosure.

As shown in FIG. 1, a vehicle system 300 of the present disclosure includes a vehicle 100 and a server 200.

The vehicle 100 may receive a radio signal and match a broadcast channel corresponding to the received radio signal. In this embodiment, the radio signal may mean a specified frequency transmitted from a broadcast station. The broadcast channel may mean a channel broadcasted by a broadcast station. When the vehicle 100 determines that a strength of the received radio signal is less than a specified value (e.g., 25 dB), the vehicle 100 transmits different information to the server 200 based on whether a destination is set. The vehicle 100 also receives a radio signal recommendation list from the server 200. The vehicle 100 may compare a strength of at least one recommended radio signal included in the radio signal recommendation list with the strength of the currently received radio signal. The vehicle 100 may determine whether to change the received radio signal based on the comparison result. When the strength of the at least one recommended radio signal included in the radio signal recommendation list exceeds the strength of the currently received radio signal, the vehicle 100 may receive the at least one recommended radio signal included in the radio signal recommendation list. In addition, when the strength of the at least one recommended radio signal included in the radio signal recommendation list is less than or equal to the strength of the currently received radio signal, the vehicle 100 does not receive the at least one recommended radio signal included in the radio signal recommendation list. The vehicle 100 re-receives a radio signal recommendation list from the server 200. The vehicle 100 are described in more detail with reference to FIG. 2.

The server 200 may determine a scheme of recommending a radio signal based on the information about whether the destination is set. The information is received from the vehicle 100. The server 200 may also determine whether the recommended radio signal in the determined recommendation scheme is applicable. In addition, the server 200 may generate the radio signal recommendation list based on the determination result.

When the server 200 receives the information about whether the destination is set from the vehicle 100 and determines that the destination is set, the server 200 may determine to recommend a radio signal based on radio signal information corresponding to a road as the radio signal recommendation scheme. In addition, when the server 200 receives the information on whether the destination is set from the vehicle 100 and determines that the destination is not set, the server 200 determines whether the radio signal is recommendable based on radio signal information corresponding to a polygon area. When the server 200 determines that the radio signal is recommendable based on the radio signal information corresponding to the polygon area, the server 200 may determine to recommend the radio signal based on the signal information corresponding to the polygon area as the radio signal recommendation scheme. In addition, when the server 200 determines that the recommendation of the radio signal is impossible based on the signal information corresponding to the polygon area, the server 200 determines to recommend the radio signal based on the radio signal information corresponding to an administrative area as the radio signal recommendation scheme. In addition, when the server 200 determines that the recommended radio signal in the determined recommendation scheme is applicable, the server 200 may generate the radio signal recommendation list based on the recommended radio signal. In addition, when the server 200 determines that the radio signal recommended in the determined recommendation scheme is not applicable, the server 200 may generate the radio signal recommendation list based on user propensity information. The server 200 are described in more detail with reference to FIG. 3.

Figure 2:
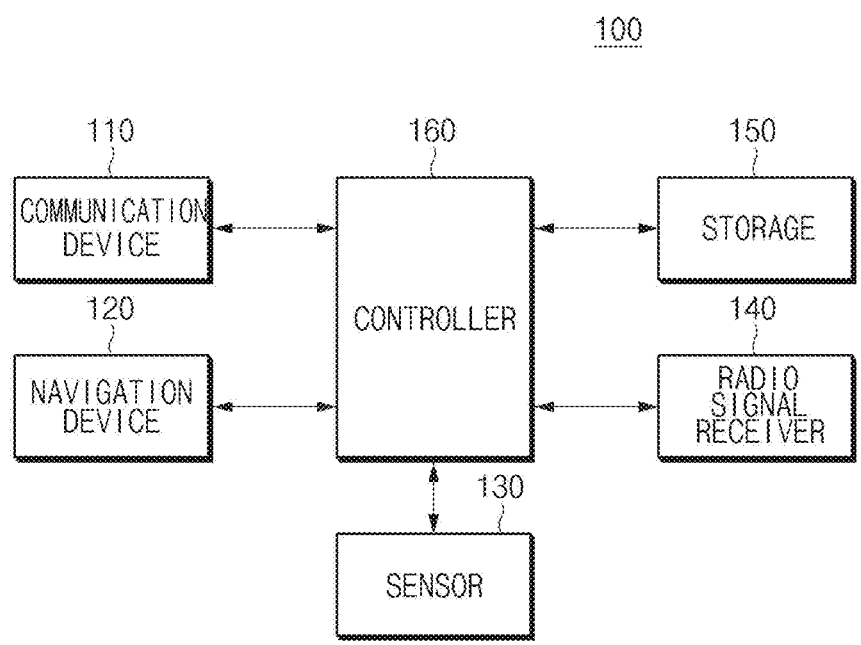
FIG. 2 is a view illustrating a configuration of a vehicle according to an embodiment of the present disclosure.

FIG. 2 is a view illustrating a configuration of a vehicle according to an embodiment of the present disclosure.

As shown in FIG. 2, the vehicle 100 may comprise a communication device 110, a navigation device 120, a sensor 130, a radio signal receiver 140, a storage 150, and a controller 160.

The communication device 110 may transmit and receive information by performing a wireless communication with the server 200. The communication device 110 may communicate with the server 200 in various wireless communication schemes, such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The navigation device 120 provides a user with information on a specific area, for example, an area around the user, in the form of a map, text, or various symbols. The navigation device 120 may also provide and guide a route to a destination set by the user. In addition, the navigation device 120 may be equipped with a GPS receiver to receive a current location of the vehicle. The navigation device may also provide map image information, road guidance image information, road guidance voice information, vehicle speed information, destination information, and the like based on the current location of the vehicle.

The navigation device 120 may include a separate output device to provide various information related to the operation of the navigation device 120 to the user through the output device. The output device may be implemented with a display device and a sound output device. The display device may visually display a map or various information related to the map. For example, the display device may display a map, a route displayed on the map, and various information related to the route. In an embodiment, information about a route from a point of departure to at least one destination, an estimated waiting time, a total required time, and the like may be displayed. The display device may be implemented using a touch screen panel.

The sound output device may acoustically output a map or various information related to the map. For example, a route or an event occurring on the route may be provided to the user in the form of voice. The sound output device may be implemented with a speaker and related components.

The sensor 130 may include a speed sensor configured to detect the speed of the vehicle. The speed sensor may be provided inside a wheel of the vehicle to detect the rotational speed of the wheel.

The radio signal receiver 140 may receive a signal transmitted from each broadcast station. The radio signal receiver 140 may be integrated with the navigation device 120.

The storage 150 may store at least one algorithm for performing the operation or execution of various instructions for the overall operations of the vehicle 100 according to an embodiment of the present disclosure. The storage 150 may include at least one of a flash memory, a hard disk, a memory card, a read-only memory (ROM), a random-access memory (RAM), an electrically erasable programmable read-only memory (EEPROM), a programmable read-only memory (PROM), a magnetic memory, a magnetic disk, and an optical disk.

The controller 160 may be implemented with various processing devices, such as a microprocessor equipped with a semiconductor chip capable of performing the operation or execution of various instructions. The controller 160 may control the overall operations performed in a vehicle according to an embodiment of the present disclosure.

In an embodiment, the controller 160 may receive a radio signal and match a broadcast channel corresponding to the currently received radio signal. The controller 160 may transmit different information to the server 200 based on whether the destination is set when the strength of the currently received radio signal is less than a specified value. When the destination is set, the controller 160 may transmit the currently received radio signal information, the matched broadcast channel information, and the destination setting information to the server 200. When the destination is not set, the controller 160 may transmit the currently received radio signal information, the matched broadcast channel information, and the current location information to the server 200.

The controller 160 may receive the radio signal recommendation list from the server 200. The controller 160 may compare the strength of the at least one recommended radio signal included in the radio signal recommendation list with the strength of the currently received radio signal. The controller 160 may determine whether to receive the radio signal based on the comparison result.

When the strength of the at least one recommended radio signal included in the radio signal recommendation list exceeds the strength of the currently received radio signal, the controller 160 may receive the at least one recommended radio signal included in the radio signal recommendation list. In addition, when the strength of the at least one recommended radio signal included in the radio signal recommendation list is less than or equal to the strength of the currently received radio signal, the controller 160 does not receive the at least one recommended radio signal included in the radio signal recommendation list and re-receives a radio signal recommendation list.

Figure 3:
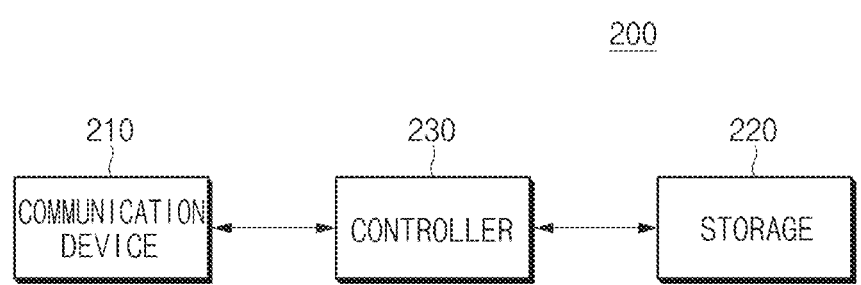
FIG. 3 is a view illustrating a configuration of a server according to an embodiment of the present disclosure.
Figure 4:
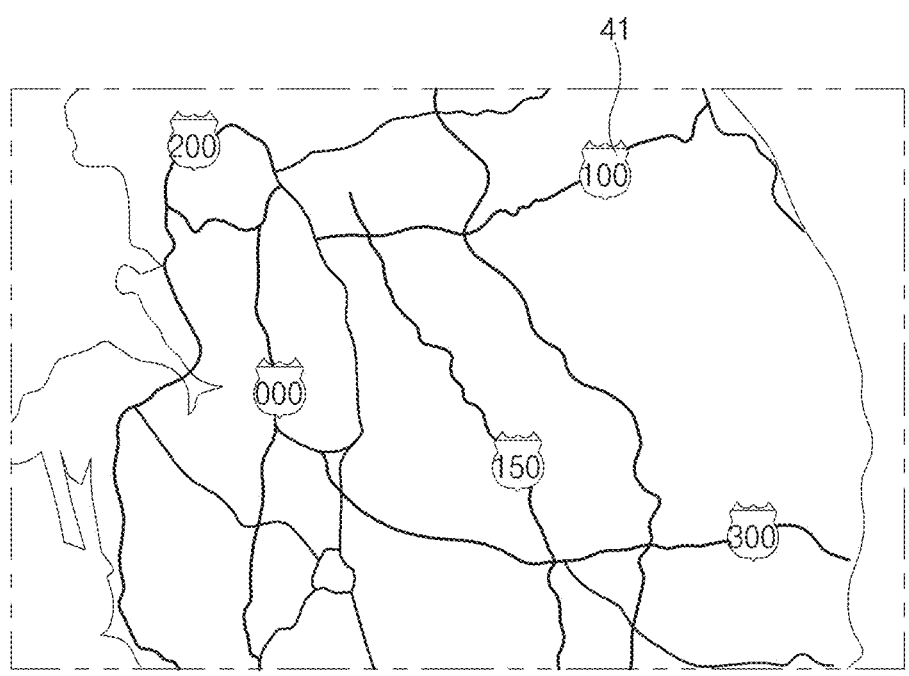
FIGS. 4-8 are views illustrating a scheme of recommending a radio signal according to an embodiment of the present disclosure.
Figure 5:
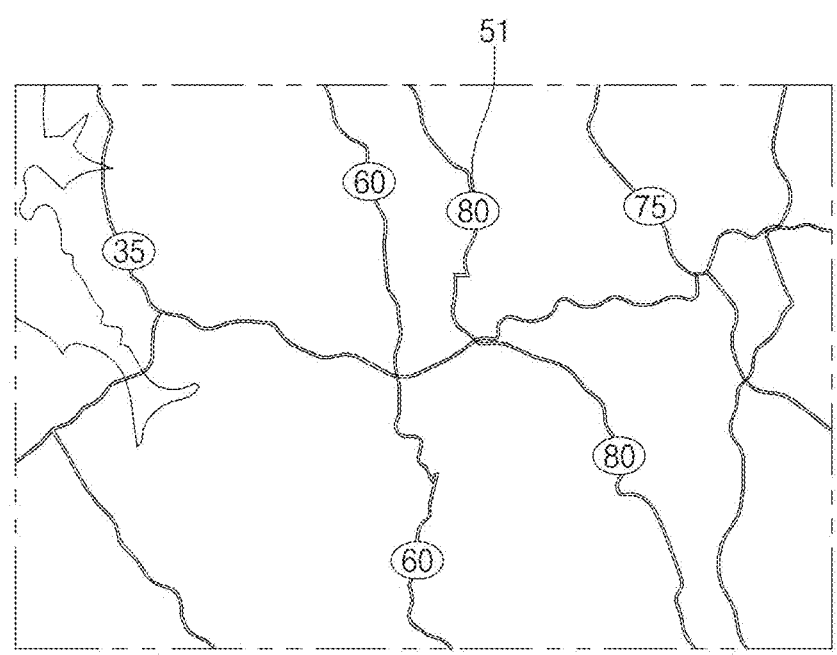
Figure 6:
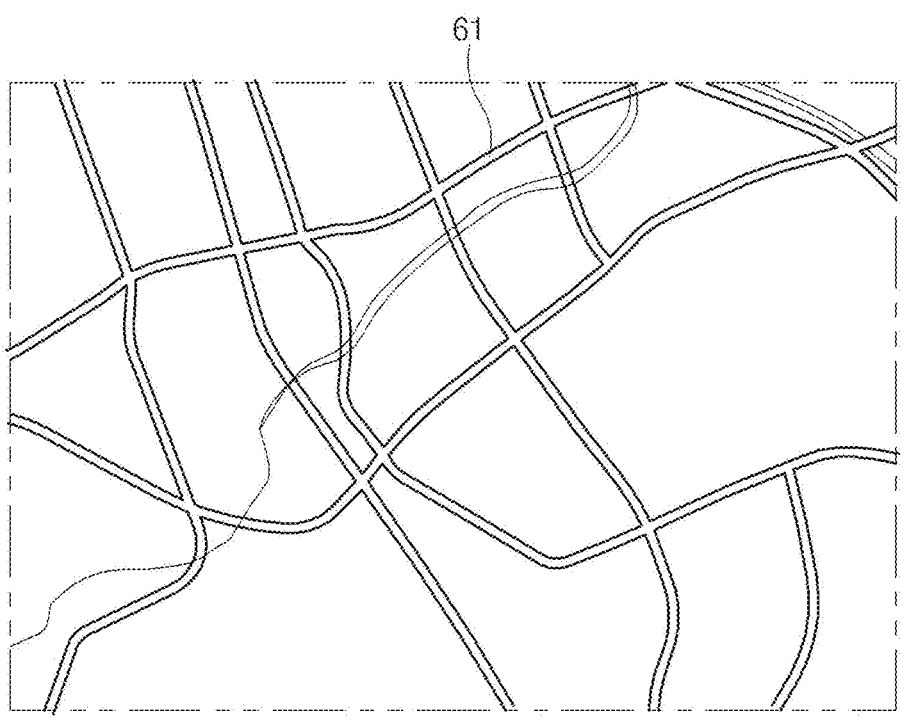

FIG. 3 is a view illustrating a configuration of a server according to an embodiment of the present disclosure.

As shown in FIG. 3, the server 200 of the present disclosure may include a communication device 210, storage 220, and a controller 230.

The communication device 210 may transmit and receive information by performing a wireless communication with the vehicle 100. The communication device 210 may communicate with the vehicle 100 through various wireless communication schemes, such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The storage 220 may store at least one algorithm for performing the operation or execution of various instructions for the overall operations of the vehicle 100 according to an embodiment of the present disclosure. In addition, the storage 220 may store at least one recommendation scheme for recommending a radio signal and may store information used in the recommendation scheme. In addition, the user may store broadcast channel information and broadcast program information having a history received by the user. The user may store content information broadcasted through the broadcast channel. In addition, the storage 220 may store radio signal information received in an area in which the vehicle is located. The storage 220 may include at least one of a flash memory, a hard disk, a memory card, a read-only memory (ROM), a random-access memory (RAM), an electrically erasable programmable read-only memory (EEPROM), a programmable read-only memory (PROM), a magnetic memory, a magnetic disk, and an optical disk.

The controller 230 may be implemented with various processing devices, such as a microprocessor equipped with a semiconductor chip capable of performing the operation or execution of various instructions. The controller 230 may control the overall operations performed in the server 200 according to an embodiment of the present disclosure. In the embodiment, the controller 230 may determine a scheme of recommending a radio signal based on whether the destination is set. The controller 230 may determine whether the recommended radio signal recommended in the determined scheme is applicable. The controller 230 may generate a radio signal recommendation list based on the determination result. In addition, the controller 230 may transmit the generated radio signal recommendation list to the vehicle 100. In this embodiment, the operation of determining the radio signal recommendation scheme based on whether the destination is set are described in more detail with reference to FIGS. 4-8. FIGS. 4-8 are views illustrating a scheme of recommending a radio signal according to an embodiment of the present disclosure.

First, the controller 230 may receive radio signal information received from the vehicle 100, broadcast channel information corresponding to the radio signal information, and information about whether the destination is set. The controller 230 may determine whether the destination is set based on the information received from the vehicle 100.

When having determined that the destination is set (Y), the controller 230 may determine to recommend a radio signal based on radio signal information corresponding to a road as the radio signal recommendation scheme. The road may include a highway (reference numeral 41 of FIG. 4), a national road (reference numeral 51 of FIG. 5), and a general road (reference numeral 61 of FIG. 6). The controller 230 may match route information generated corresponding to a destination setting on the road. The controller 230 may recommend a radio signal corresponding to the road matched with the route information. In this embodiment, the radio signal corresponding to the road may be implemented with a road-based radio signal map. The controller 230 may generate the road-based radio signal map by interconnecting a link classifying a road in units of a specified distance (1 km to 2 km) with a receivable radio signal. For example, when the route generated by the destination set by the user is generated on the highway and the general road, the controller 230 may recommend a radio signal interconnected with a link classifying the highway in units of a specified distance and a link classifying the general road in units of a specified distance.

Figure 7:
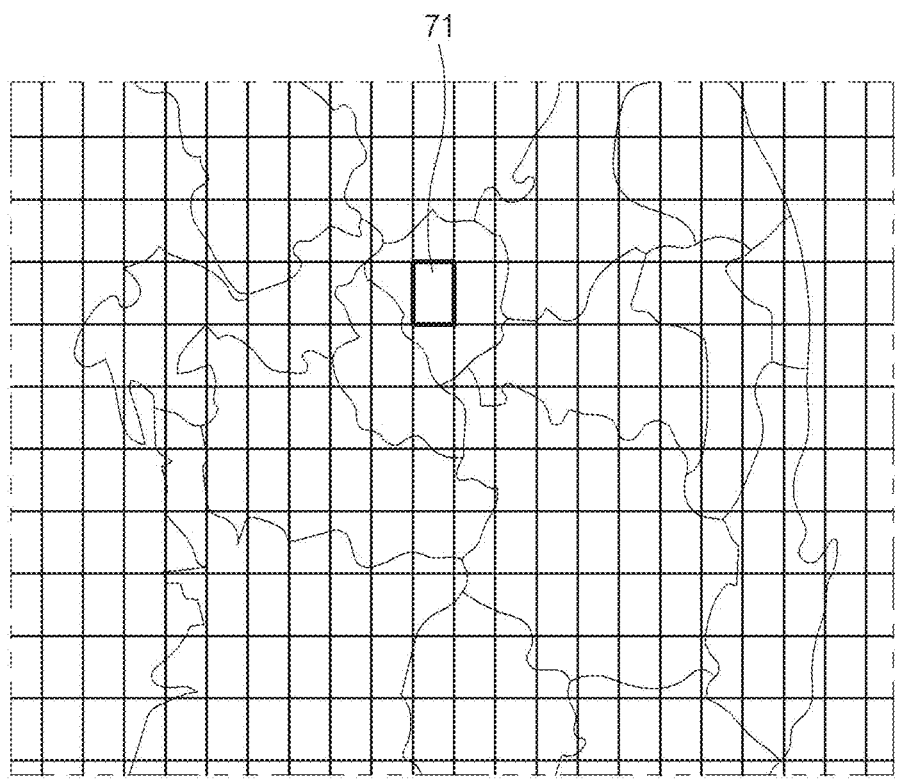
Figure 8:
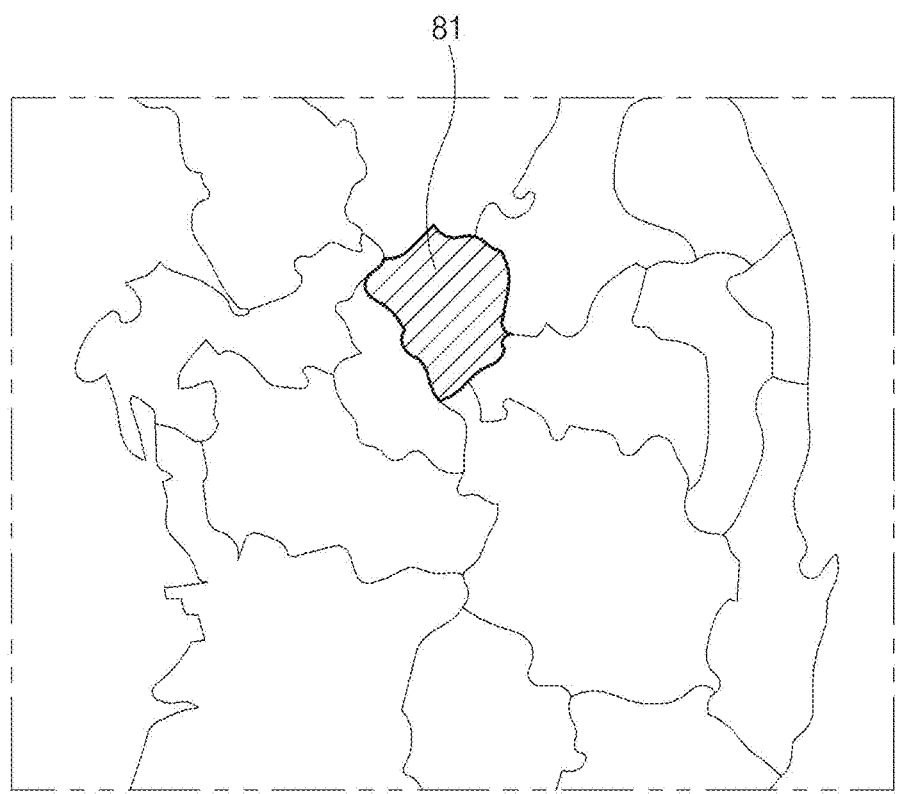

Meanwhile, when having determined that the destination is not set (N), the controller 230 may determine whether to recommend a radio signal based on radio signal information corresponding to a polygon area (reference numeral 71 of FIG. 7). When the controller 230 determines that it is possible to recommend the radio signal based on the radio signal information corresponding to the polygon area (reference numeral 71 of FIG. 7), the controller 230 may determine to recommend the radio signal based on the radio signal corresponding to the polygon area as the radio signal recommendation scheme. In this embodiment, the polygon area 71 may include an area obtained by dividing a national map into a specified size. As shown in FIG. 7, the polygon area 71 may include a rectangle, but the embodiment is not limited thereto. The polygon area 71 may be implemented in various figures. The specified size may be 200 m to 400 m according to an embodiment of the present disclosure. The radio signal information corresponding to the polygon area 71 may be implemented with a radio signal map based on the polygon area 71. The controller 230 may generate the radio signal based on the polygon area 71 interconnected with the radio signal receivable within the polygon region 71. For example, when the user does not set a destination, the controller 230 may determine the polygon area 71, in which the vehicle is currently located. The controller 230 may recommend the radio signal interconnected with the polygon area 71, in which the vehicle is located.

Meanwhile, when having determined that the radio signal cannot be recommended based on the radio signal information corresponding to the polygon area (reference numeral 71 of FIG. 7), the controller 230 may determine to recommend a radio signal based on radio signal corresponding to an administrative area (reference numeral 81 of FIG. 8) as the radio signal recommendation scheme. In this embodiment, the administrative area 81 may include a plurality of sections divided by the states in order to realize the public interest of the people. For example, the administrative area 81 may be divided into units of cities, counties, and districts. In this embodiment, the radio signal information corresponding to the administrative area 81 may be implemented as an administrative area 81 based radio signal map. The controller 230 may generate the administrative area 81 based radio signal map interconnected with the radio signal receivable within the administrative area 81. For example, when the user does not set a destination and it is impossible to recommend a radio signal based on the polygon area 71, the controller 230 may recommend the radio signal interconnected with the administrative area 81, in which the vehicle is currently located.

The controller 230 may generate the road-based radio signal map, the polygon area-based radio signal map, and the administrative area-based radio signal map based on the radio signal received at the location of the vehicle. The maps are used when recommending the radio signal as the radio signal recommendation scheme determined based on whether the destination is set.

First, the controller 230 receives the vehicle information. In this embodiment, the vehicle information may include the location of the vehicle (GPS coordinates, administrative area code), the time, the vehicle speed, the strength of the radio signal being received, and the radio signal strengths of all channels. The controller 230 may collect a radio signal received for each vehicle location and match the collected radio signal with a broadcast channel. In other words, the broadcast channel corresponding to the received radio signal may be identified by matching the radio signal received for each vehicle location with the corresponding broadcast channel. The controller 230 determines whether to store the received radio signal according to whether the current weather condition is clear when having determined that the vehicle is located in a new visited area, where there has never been a previous visit history. In other words, the controller 230 may store the radio signal when the current weather is clear and a signal reception state is normal. In this embodiment, the new visited area may be classified into at least one of a road, a polygon area, and an administrative area. Meanwhile, the controller 230 may re-receive the vehicle information when the signal reception state is poor because the current weather is not clear.

When the radio signal is recommended based on the recommendation method determined based on whether the destination is set, the controller 230 may determine whether the recommended radio signal is applicable. In an embodiment, the controller 230 may determine that the recommended radio signal is applicable when the broadcast channel corresponding to the recommended radio signal is the same as the broadcast channel corresponding to the radio signal received by the vehicle 100. The controller 230 may identify the broadcast channel corresponding to the radio signal received by the vehicle 100 based on the information received from the vehicle 100.

When the controller 230 determines that the broadcast channel corresponding to the recommended radio signal is the same as the broadcast channel corresponding to the radio signal being received by the vehicle 100, the controller 230 may determine that the recommended radio signal is applicable. The controller 230 may generate a radio recommendation list based on the recommended radio signal. However, when the broadcast channel corresponding to the recommended radio signal is different from the broadcast channel corresponding to the radio signal received by the vehicle, the controller 230 may generate a radio signal recommendation list based on a personal propensity. In this embodiment, when the broadcast channel corresponding to the recommended radio signal and the broadcast channel corresponding to the radio signal received from the vehicle are not the same, the broadcast channel corresponding to the recommended radio signal is broadcasted only in the area where the vehicle is currently located. Thus, the broadcast channel may be a broadcast channel not broadcasted in the area where the vehicle is receiving the radio signal. In another embodiment, the broadcast channel corresponding to the received radio signal may not be broadcasted in the area where the vehicle is located (or an area where the vehicle is located).

The controller 230 may generate the radio signal recommendation list based on a user propensity. The user propensity may be set based on a radio signal received by a user. In an embodiment, the controller 230 collects a radio signal received by a user and matches the collected information-based broadcast channel. The controller 230 may receive program information based on the program information of the broadcast channel. The controller 230 may set the user propensity based on the program information corresponding to the radio signal received by the user based on the received program information. For example, when having determined that the radio signal received by the user is receiving the latest pop music program of frequency 'A', the controller 230 may determine that the user prefers the latest pop music listening.

The controller 230 may generate the radio signal recommendation list based on the user propensity set as described above. For example, when having determined that the user prefers the latest pop music listening, the controller 230 may generate a radio signal recommendation list based on a radio signal of a broadcast channel through which the latest pop music is broadcasted.

When the reception of the radio signal broadcasting the latest pop music is not easy, the controller 230 may generate a radio signal recommendation list based on a radio signal that can be received based on a user listening history or based on a real-time listening rate rank at the current location of the vehicle.

In addition, when the radio signal recommendation list is generated, the controller 230 may control to transmit the radio signal recommendation list to the vehicle 100.

Figure 9:
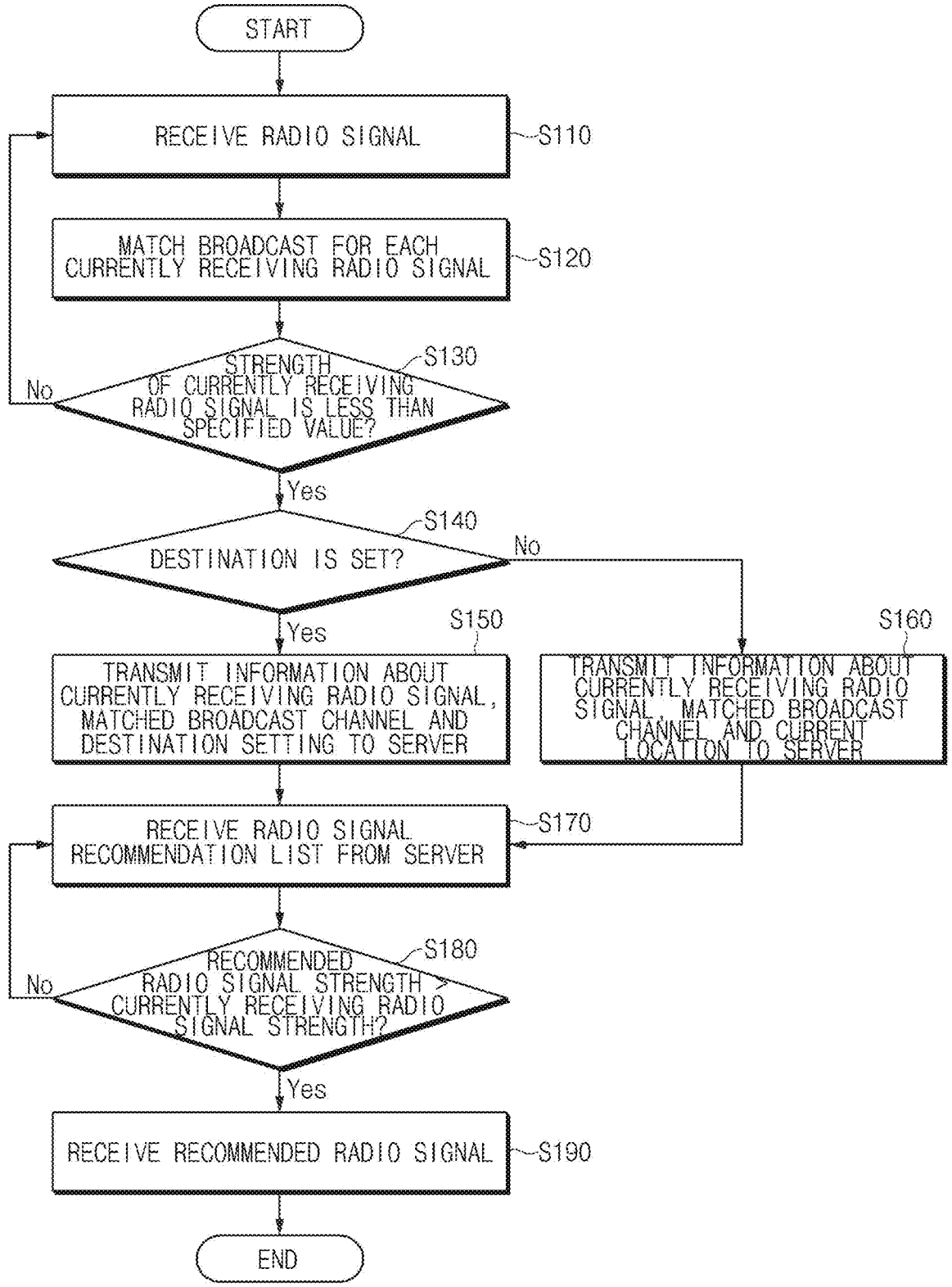
FIG. 9 is a flowchart illustrating an operation of a vehicle according to an embodiment of the present disclosure.

FIG. 9 is a flowchart illustrating an operation of a vehicle according to an embodiment of the present disclosure.

As shown in FIG. 9, in operation S110, the controller 160 receives a radio signal. In operation S120, the controller 160 matches the radio signal received in operation S110 with a broadcast channel.

In operation S130, the controller 160 determines whether a strength of the radio signal being received is less than a specified value. When having determined in operation S130 that the received radio signal is less than a specified value (Y), in operation S140, the controller 160 determines whether a destination is set. Meanwhile, when having determined in operation S130 that the received radio signal is greater than or equal to the specified value (N), in operation S110, the controller 160 receives the radio signal.

When having determined in operation S140 that the destination is set, in operation S150, the controller 160 transmits, to the server 200, the radio signal information received in operation S110, the broadcast channel information matched in operation S120, and the set destination setting information. Meanwhile, when having determined in operation S140 that the destination is not set, in operation S160, the controller 160 transmits, to the server 200, the radio signal information received in operation S110, the broadcast channel information matched in operation S120, and the current location information.

The controller 160 receives the radio signal recommendation list from the server 200 (S170). The controller 160 determines whether the recommended radio signal strength exceeds the currently received radio signal strength (S180). When having determined in operation S180 that the recommended radio signal strength exceeds the currently received radio signal strength (Y), in operation S190, the controller 160 receives the recommended radio signal. When having determined in operation S180 that the recommended radio signal strength is less than or equal to the currently received radio signal strength (N), the controller 160 performs an operation S170.

Figure 10:
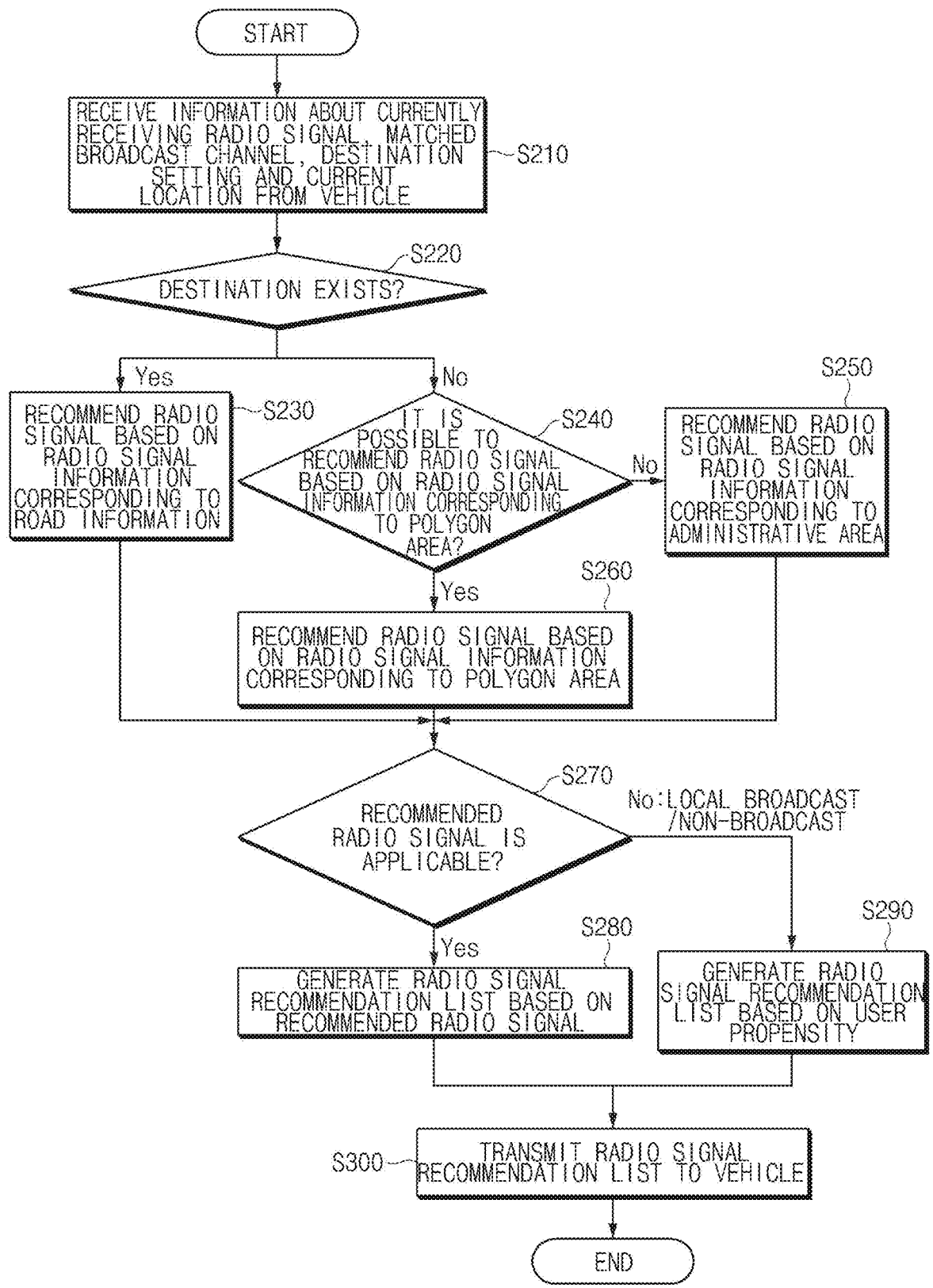
FIG. 10 is a flowchart illustrating an operation of a server according to an embodiment of the present disclosure.

FIG. 10 is a flowchart illustrating an operation of a server according to an embodiment of the present disclosure.

As shown in FIG. 10, in operation S210, the controller 230 receives radio signal information currently received from the vehicle 100, matched broadcast channel information, destination setting information when the destination setting information exists, and current location information of the vehicle when there is no destination setting information. In operation S220, the controller 230 determines whether the destination setting information is received from the vehicle 100 in operation S210. When the destination setting information is received in operation S220 (Y), the controller 230 recommends a radio signal based on the radio signal information corresponding to a road information in operation S230. The radio signal information corresponding to the road information in operation S230 may be implemented with a road-based radio signal map. The controller 230 may generate the road-based radio signal map by interconnecting a link of classifying a road in units of a specified distance (1 km to 2 km) with the receivable radio signal. For example, when the route generated by the destination set by the user is generated on a highway and a general road, the controller 230 may recommend a radio signal interconnected with a link of classifying the highway in units of a specified distance and a link of classifying the general road in units of a specified distance.

Meanwhile, when having determined in operation S220 that the controller 230 does not receive the destination information (N), in operation S240, the controller 230 may determine whether to recommend a radio signal based on radio signal information corresponding to a polygon area.

When having determined in operation S240 that it is possible to recommend a radio signal based on the radio signal information corresponding to the polygon region (Y), in operation S260, the controller 230 recommends the radio signal based on the radio signal corresponding to the polygon area. In this embodiment, the radio signal information corresponding to the polygon area may be implemented with a polygon area-based radio signal map. The controller 230 may generate the polygon area-based radio signal map interconnected with the radio signal receivable in one polygon area. For example, when the user does not set a destination, in operation S260, the controller 230 determines the polygon area, in which the vehicle is currently located. The controller 230 recommends the radio signal interconnected with the polygon area 71, in which the vehicle is located.

When having determined in operation S240 that it is impossible to recommend the radio signal based on the radio signal information corresponding to the polygon area (N), in operation S250, the controller 230 recommends a radio signal based on the radio signal corresponding to an administrative area. In this embodiment, the radio signal information corresponding to the administrative area may be implemented as an administrative area-based radio signal. The administrative area-based radio signal map may be generated in interconnection with a radio signal receivable in one administrative area. For example, when the user does not set a destination and it is impossible to recommend a radio signal based on a polygon area, the controller 230 may recommend a radio signal interconnected with the administrative area, where a vehicle is currently located.

In operation S270, the controller 230 determines whether the radio signals recommended in operations S230, S260 and S250 are applicable. When having determined in operation S270 that the broadcast channel corresponding to the recommended radio signal is the same as the broadcast channel corresponding to the radio signal received by the vehicle, in operation S280, the controller 230 determines that the radio signals recommended in operations S230, S260 and S250 are applicable (Y). The controller 230 generates a radio signal recommendation list based on the recommended radio signals.

When having determined in operation S270 that the broadcast channel corresponding to the recommended radio signal and the broadcast channel of the radio signal received by the vehicle are not the same, in operation S290, the controller 230 determines that it is impossible to apply the radio signals recommended in operations S230, S250 and S260 (N). The controller 230 generates a radio signal recommendation list based on a user propensity. The operation of setting a user propensity in operation S290 are described with reference to FIG. 12.

In operation S290, when having determined that a user prefers the latest pop music listening, the controller 230 may generate a radio signal recommendation list based on a radio signal of the broadcast channel through which the latest pop music is broadcasted. However, when it is not easy to receive the radio signal currently broadcasting the latest pop music, the controller 230 may generate a radio signal recommendation list based on a currently receivable radio signal and the user listening history or based on a real-time listening rate ranking at the current location of the vehicle.

When the radio signal recommendation list is generated in operations S280 to S290, in operation S300, the controller 230 transmits the radio signal recommendation list to the vehicle 100.

Figure 11:
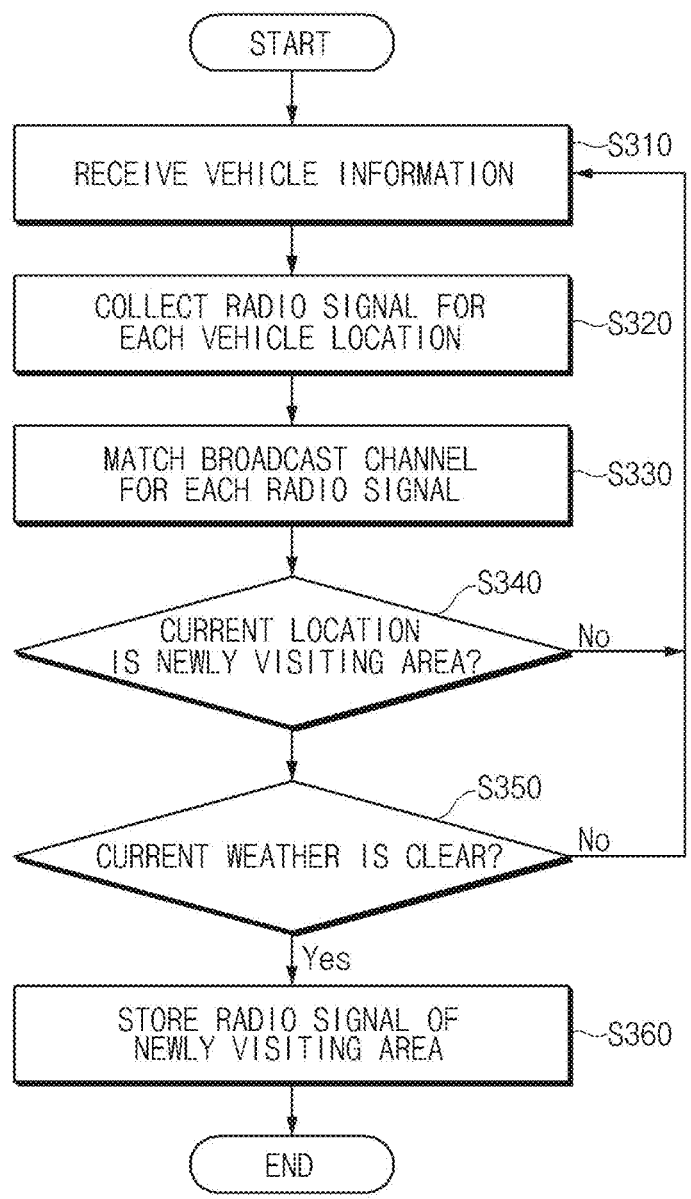
FIG. 11 is a flowchart illustrating a method of updating radio signal map information according to an embodiment of the present disclosure.

FIG. 11 is a flowchart illustrating a method of updating radio signal map information according to an embodiment of the present disclosure.

As illustrated in FIG. 11, the controller 230 receives the information about the vehicle in operation S310. The vehicle information in operation S310 may include the location of the vehicle (GPS coordinates, administrative area code), the time, the vehicle speed, the strength of the radio signal being received, and the radio signal strengths of all channels.

The controller 230 may collect a radio signal received for each vehicle position in operation S320 and match the collected radio signal with a broadcast channel in operation S330. In operations S320 and S330, the controller 230 may identify the broadcast channel corresponding to the received radio signal by matching the broadcast channel with the radio signal received for each vehicle position.

The controller 230 determines whether the location of the vehicle is a new visited area without a previous visit history in operation S340. When having determined in operation S340 that the location of the vehicle is a new visited area without a previous visit history (Y), the controller 230 determines whether the current weather condition is clear in operation S350. The receiving rate of the radio signal is different according to the weather condition. Thus, the determining whether the weather condition is clear by the controller 230 in operation S350 is for the purpose of determining whether it is easy to receive a radio signal. When having determined in operation S350 that the current weather is clear and the signal reception state is normal, in operation S360, the controller 230 stores the radio signal information corresponding to the new visited area. In operation S360, the new visited area may be classified into at least one of a road, a polygon area, and an administrative area. Meanwhile, when the current location is not a new visited area (N) in operation S340, or the reception state is not normal because the current weather is not clear in operation S350, the controller 230 performs an operation S310 to re-receive the vehicle information.

Figure 12:
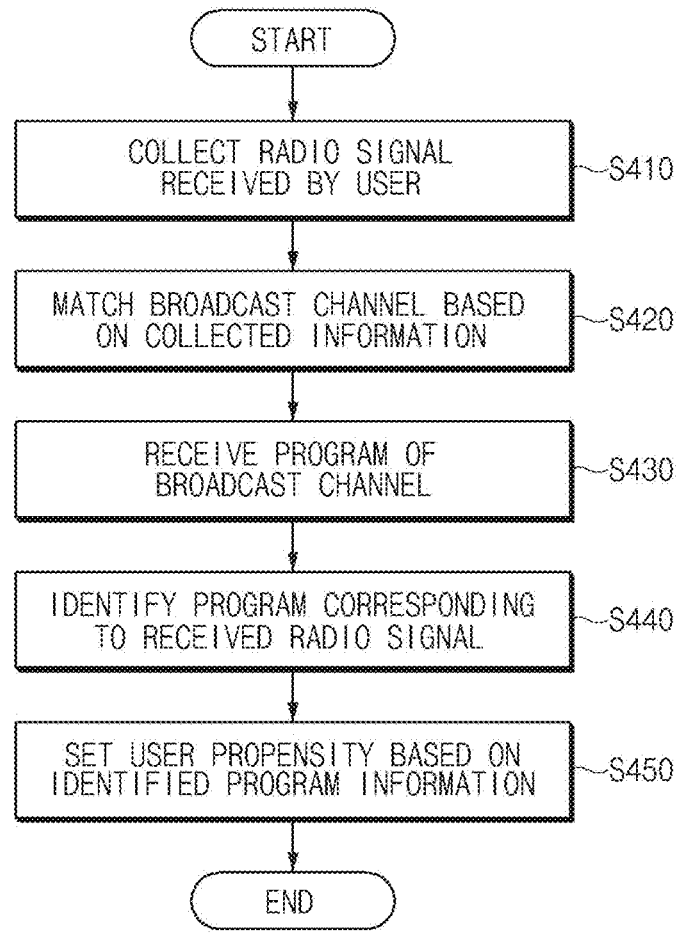
FIG. 12 is a flowchart illustrating a method for storing personal propensity information according to an embodiment of the present disclosure.

FIG. 12 is a flowchart illustrating a method for storing personal propensity information according to an embodiment of the present disclosure.

As illustrated in FIG. 12, the controller 230 collects a radio signal received by the user in operation S410. In operation S420, the controller 230 matches a broadcast channel based on the radio signal information collected in S410. In operation S430, the controller 230 receives program information in the broadcast channel matched in operation S420. In operation S440, the controller 230 identifies the program corresponding to the received radio signal. In operation S450, the controller 230 may set a user propensity based on the identified program information. For example, when the identified program information is the latest pop music program in operation S440, the controller 230 may determine that the user prefers the latest pop music listening and may set the preferred genre as the user propensity.

Figure 13:
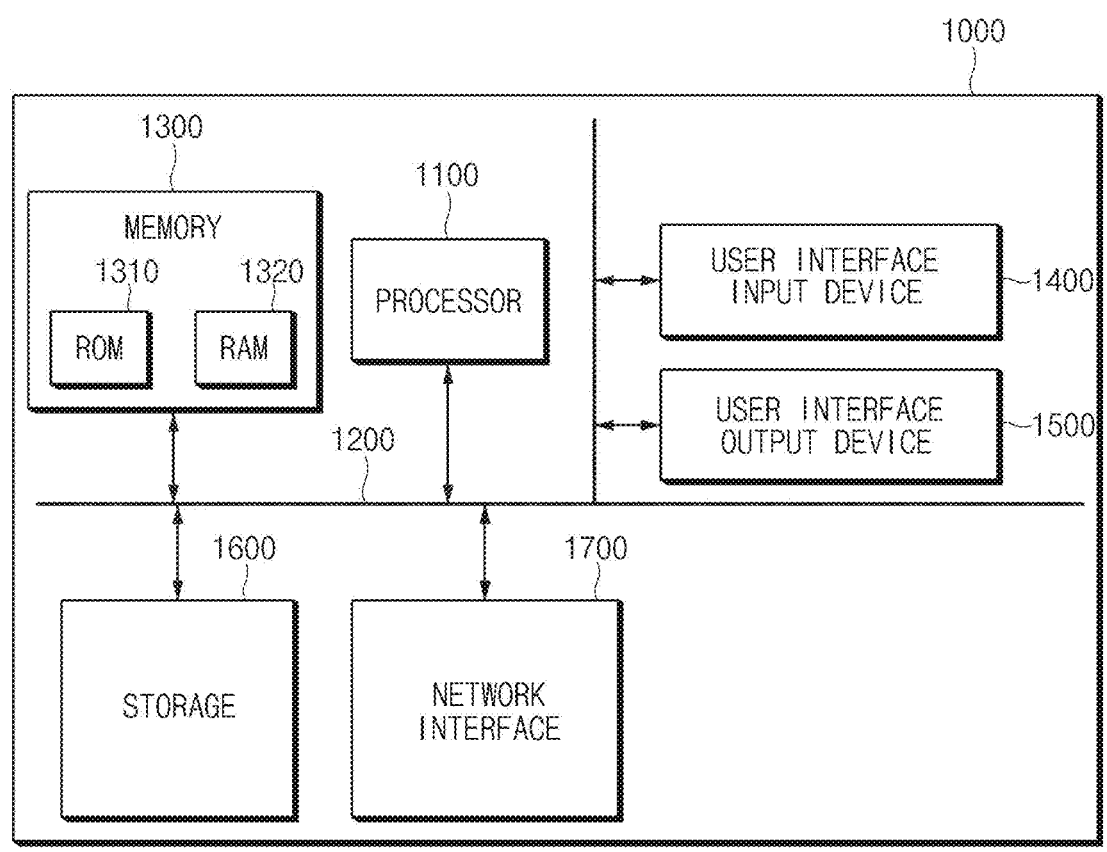
FIG. 13 is a view illustrating a computing system for executing a method according to an embodiment of the present disclosure.

FIG. 13 is a view illustrating a computing system for executing a method according to an embodiment of the present disclosure.

Referring to FIG. 13, a computing system 1000 may include at least one processor 1100, a memory 1300, a user interface input device 1400, a user interface output device 1500, a storage 1600, and a network interface 1700. These components are connected with each other via a bus 1200.

The processor 1100 may be a central processing device (CPU) or a semiconductor device configured to process instructions stored in the memory 1300 and/or the storage 1600. The memory 1300 and the storage 1600 may comprise various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in a hardware or a software module executed by the processor 1100, or in a combination thereof. The software module may reside on a storage medium (in other words, the memory 1300 and/or the storage 1600), such as a RAM, a flash memory, a ROM, an EPROM, an EEPROM, a register, a hard disk, a removable disk, a CD-ROM. The storage medium may be coupled to the processor 1100. The processor 1100 may read information out of the storage medium and may record information in the storage medium. In another embodiment, the storage medium may be integrated with the processor 1100. The processor 1100 and the storage medium may reside in an application specific integrated circuit (ASIC). The ASIC may reside within a user terminal. In another embodiment, the processor 1100 and the storage medium may reside in the user terminal as separate components.

According to the embodiments of the present disclosure, the vehicle, the server, the vehicle system, and the method of recommending a radio signal can recommend another radio signal of the same broadcast channel or a replaceable broadcast channel when it is not easy to receive a radio signal. Thus, it is possible to provide a service for continuously receiving a radio signal without a user's separate operation.

The above description is a simple exemplification of the technical spirit of the present disclosure. The present disclosure may be variously corrected and modified by those having ordinary skill in the art to which the present disclosure pertains without departing from the essential features of the present disclosure.

Therefore, the disclosed embodiments of the present disclosure are illustrative and do not limit the technical spirit of the present disclosure. The scope of the technical spirit of the present disclosure is not limited by the embodiments of the present disclosure. The scope of the present disclosure should be construed by the claims. It should be understood that all the technical spirits within the equivalent range fall within the scope of the present disclosure.

What is claimed is:

1. A vehicle system comprising:
a server configured to set a radio signal recommendation scheme based on whether a destination is set, determine whether a recommended radio signal recommended in a set recommendation scheme is applicable, and transmit a radio signal recommendation list generated based on a determination result; and
a vehicle configured to receive a radio signal, wherein the vehicle receives the radio signal recommendation list from the server when a strength of the received radio signal is less than a specified value, compares a strength of at least one recommended radio signal included in the radio signal recommendation list with the strength of the received radio signal, and determines whether to receive the recommended radio signal based on a comparison result.

2. The vehicle system of claim 1, wherein the server is further configured to receive information about whether the destination is set from the vehicle, and determine to recommend a radio signal based on radio signal information corresponding to road information as the radio signal recommendation scheme when the server determines that the destination is set.

3. The vehicle system of claim 1, wherein the server is further configured to receive information about whether the destination is set from the vehicle, and determine whether a radio signal is recommendable based on radio signal information corresponding to a polygon area when the destination is not set.

4. The vehicle system of claim 3, wherein the server is further configured to determine to recommend the radio signal based on the radio signal information corresponding to the polygon area as the radio signal recommendation scheme when the server determines that the radio signal is recommendable based on the signal information corresponding to the polygon area.

5. The vehicle system of claim 3, wherein the server is further configured to determine to recommend a radio signal based on radio signal information corresponding to administrative area as the radio signal recommendation scheme when the server determines that the radio signal is unrecommendable based on the signal information corresponding to the polygon area.

6. The vehicle system of claim 1, wherein the server is further configured to determine that the recommended radio signal is applicable and generate the radio signal recommendation list based on the recommended radio signal when the server determines that a broadcast channel corresponding to the recommended radio signal recommended in the determined recommendation scheme is the same as a broadcast channel corresponding to the radio signal received by the vehicle.

7. The vehicle system of claim 1, wherein the server is further configured to determine that the recommended radio signal is not applicable and generate the radio signal recommendation list based on user propensity information when the server determines that a broadcast channel corresponding to the recommended radio signal recommended in the determined recommendation scheme is different from a broadcast channel corresponding to the radio signal received by the vehicle.

8. The vehicle system of claim 1, wherein the vehicle is further configured to receive the at least one recommended radio signal included in the radio signal recommendation list when the strength of the at least one recommended radio signal included in the radio signal recommendation list exceeds the strength of the currently received radio signal.

9. The vehicle system of claim 1, wherein the vehicle is configured to re-receive the radio signal recommendation list when the strength of the at least one recommended radio signal included in the radio signal recommendation list is equal to or less than the strength of the currently received radio signal.

10. A method of recommending a radio signal, the method comprising:
receiving, by a vehicle, a radio signal;
determining, by a server, a radio signal recommendation scheme based on whether a destination of the vehicle is set when a strength of the received radio signal is less than a specified value;
determining whether a recommended radio signal recommended in the recommendation scheme determined by the server is applicable and generating a radio signal recommendation list based on the determination result; and
receiving the radio signal recommendation list from the server, comparing a strength of at least one recommended radio signal included in the radio signal recommendation list with the strength of the currently received radio signal, and determining whether to receive the recommended radio signal recommended based on a comparison result.

11. The method of claim 10, wherein the determining of the radio signal recommendation scheme includes:
determining to recommend a radio signal based on radio signal information corresponding to road information as the radio signal recommendation scheme when having determined that the destination of the vehicle is set.

12. The method of claim 10, wherein the determining of the radio signal recommendation scheme further includes:
determining whether the radio signal is recommendable based on radio signal information corresponding to a polygon area when the destination of the vehicle is not set.

13. The method of claim 12, wherein the determining of whether the radio signal is recommendable further includes:
determining to recommend a radio signal based on radio signal information corresponding to administrative area as the radio signal recommendation scheme when having determined that the radio signal is unrecommendable based on the signal information corresponding to the polygon area.

14. The method of claim 10, wherein the generating of the radio signal recommendation list includes:
comparing a broadcast channel corresponding to the recommended radio signal recommended in the determined recommendation scheme with a broadcast channel corresponding to the radio signal received by the vehicle;
determining that the recommended radio signal is applicable and generating the radio signal recommendation list based on the recommended radio signal when having determined that the broadcast channel corresponding to the recommended radio signal recommended in the determined recommendation scheme is the same as the broadcast channel corresponding to the radio signal received by the vehicle; and determining that the recommended radio signal is not applicable and generating the radio signal recommendation list based on user propensity information when having determined that the broadcast channel corresponding to the recommended radio signal recommended in the determined recommendation scheme is different from the broadcast channel corresponding to the radio signal received by the vehicle.

15. The method of claim 10, wherein the determining of whether to receive the radio signal based on the comparison result further includes:

comparing the strength of the at least one recommended radio signal included in the radio signal recommendation list with the strength of the currently received radio signal;

receiving the at least one recommended radio signal included in the radio signal recommendation list when the strength of the at least one recommended radio signal included in the radio signal recommendation list exceeds the strength of the currently received radio signal; and re-receiving a radio signal recommendation list when the strength of the at least one recommended radio signal included in the radio signal recommendation list is equal to or less than the strength of the currently received radio signal.

\* \* \* \* \*